Patented Feb. 4, 1941

2,230,240

UNITED STATES PATENT OFFICE 2,230,240

METHOD FOR MAKING A RESINOUS PRODUCT FROM VINYL COMPOUNDS AND ANHYDRIDES OF UNSATURATED DICARBOXYLIC ACIDS

Howard L. Gerhart, Philadelphia, Pa., assignor to The United Gas Improvement Company, Philadelphia, Pa., a corporation of Pennsylvania No Drawing. Application May 18, 1937, Serial No. 143,390

14 Claims. (Cl. 260—78)

My invention relates to a new and useful resinous product, and to the method of preparing the same, and more particularly it relates to the production of a synthetic resinous product of advantageous properties and of wide applicability in the industries.

One object of the present invention is to provide a novel resinous composition which has a comparatively high molecular weight, will not support combustion, and is thermoplastic so that it will soften when heated to an elevated temperature, in which condition it can be molded to the desired shape or form and will harden at temperatures below the original softening temperature.

Another object of the invention is to provide a thermoplastic, synthetic, resinous product which is highly resistant to organic liquids in general, and is insoluble in hydrocarbons of the aliphatic, naphthenic, and aromatic types, dilute alkalies and in esters, alcohols, ketones and anhydrides. While the product swells slightly in the lower members of the latter organic series, such as ethyl acetate, acetic anhydride, and acetone, the original shape and size may be restored if the swelled articles are heated for a short time.

Still another object of the invention is to furnish a resinous composition capable of being cast, molded or otherwise employed in the production of articles of the desired shapes and sizes, which articles are of high tensile strength, and rupture modulus and may be machined and polished, if desired, by conventional methods.

Another object of the invention is to provide a resinous product which is homogeneous in structure and is as clear and transparent as the clearest glass or crystal, and which may be either water-white, or colored to the desired shade by the addition of a suitable dye during the production thereof.

Other objects, including the novel method of making the product of the described properties, will be apparent from a consideration of the specification and claims.

The present invention contemplates the reaction of a vinyl compound with an anhydride of an unsaturated dicarboxylic acid under the controlled conditions hereinafter to be discussed. The compounds included within the term "vinyl compound" and applicable for use in the reaction may be designated by the formula $R-HC=CH_2$ where $R$ is halogen, an aryl radical, an $OOCR'$ radical where $R'$ is an alkyl group, or an $OR''$ radical where $R''$ is an alkyl or an aryl group. Thus, styrene or vinyl benzene, vinyl acetate, vinyl chloride, vinyl butyrate, vinyl chloracetate, and the like, may be used. Of these, due to its availability and relatively high boiling point, styrene is preferred.

The term "an anhydride of an unsaturated dicarboxylic acid" defines those compounds whose formula may be represented by:

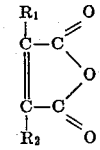

where $R_1$ and $R_2$ stand for hydrogen, halogen, the sulphonic acid radical, or an alkyl, aryl or aralkyl radical. Maleic anhydride is the anhydride preferred for use, but other anhydrides of the above formula, such as monochlormaleic anhydride, citraconic anhydride, itaconic anhydride and the like may be employed. Obviously, mixtures of two or more anhydrides or two or more vinyl compounds may be used. For example, a mixture of maleic anhydride and monochlormaleic anhydride furnishes a slower reaction than maleic anhydride alone, and a faster reaction than monochlormaleic anhydride alone.

The process of the present invention is predicated upon careful control with respect to temperature conditions so that the reaction will proceed uniformly throughout the reacting mass without removal of any appreciable portion of either of the reactants. It has been found that if, for example, the vinyl compound is removed from the sphere of reaction, even though returned, the product does not possess the desired properties due probably to local regions of high and low concentration of the reactants. Furthermore, ebullition during the reaction causes bubbles in the resulting product which destroy the homogeneity and transparency often desired.

In accordance with the invention, the reaction between the vinyl compound and the anhydride is conducted below the boiling point (at the pressure used) of the lowest-boiling component of the mixture which in most instances is the vinyl compound. In the case of certain vinyl compounds, for example, vinyl chloride whose boiling point is in the neighborhood of $-18°$ C., it is necessary to operate under pressure, and in this instance, as in the case of the other vinyl compounds, the reaction mixture is heated to a sufficient temperature to cause the reaction, but care is taken to maintain the temperature below the boiling point of the low-boiling reactant at the particular pressure employed. Vinyl acetate (boiling point about 75° C.), and styrene (boiling point about 145° C.), can be reacted with the anhydride at atmospheric pressure. Since the reaction is exothermic, the reacting vessel generally requires external cooling to maintain the temperature below the boiling point of the low-boiling reactant, and it is desirable to reduce the temperature considerably below this point in order that a prolonged, easily controlled reaction will take place. If the reaction becomes sluggish, heat may be applied with subsequent cooling if necessary.

At the time the reaction starts, the reacting mixture, when no coloring matter is present, becomes a greenish to straw-color shade which gradually disappears with increasing viscosity of the mass. The reaction is preferably carried out until it is complete as indicated when it is no longer possible to generate an appreciable amount of heat exothermically. The mass has then lost its greenish coloration and exists as a stiff semi-solid gel at the elevated temperature or a solid product at room temperature. Thereafter, the product may be used in the various fields since the polymerization is substantially complete. However, as a matter of precaution to free the mass of any of the unreacted components and to solidify the product further, it is advisable to heat the product substantially above the boiling point of such unreacted components but below the decomposition temperature of the product. The time of secondary heating may vary widely but in general a heating at a relatively low temperature within the range specified for a relatively long time is to be preferred.

As an additional precaution to insure uniform distribution of and intimate contact between the reactants before the reaction starts, it is advisable to heat the mixture gently above the melting point of the anhydride until a homogeneous liquid is formed, and it is this which constitutes the reacting mixture. For example, at atmospheric pressure, the liquid is formed when the mixture of reactants is heated to 50° C. to 60° C.

The vinyl compound and the anhydride react together in equimolecular proportion to give the product desired and preferably are present in the reacting mixture in such proportions, although some tolerance is permissible. In general, any excess should consist of the vinyl compound. Even a slight excess of the anhydride is undesirable for the following reasons: (1) it tends to impart a marble-like or milky appearance to the product; (2) it tends to make the product soluble in acetone or alkalies; and (3) it tends to appear in chemical combination within the product, thus preventing its removal in the secondary heating. While an excess of 10% or even more of the vinyl compound may not deleteriously affect the results, since the excess usually tends to collect above the reaction product, the use of this excess is not recommended.

When a transparent product is desired, the reactants should be relatively pure in order not to bring into the product foreign materials, although the vinyl compound may contain a substantial proportion of an indifferent liquid contaminant of a boiling point in the neighborhood of or above that of the vinyl compound without destroying the results desired, since the liquid may be removed during the carefully controlled secondary heating process. In general, however, the vinyl compound advantageously does not contain more than about 10% of contaminants.

In a typical case, an intimate mixture of 5.4 grams styrene and 4.9 grams maleic anhydride is heated to 55° C. in a test tube. The mixture is agitated to form a homogeneous liquid and the test tube is heated slowly in an oil bath at 130° C. Agitation is discontinued after a minute and in five minutes at 130° C. the solution thickens to a syrup. As soon as the first bubbles appear, a sharp rise in temperature is noted on a thermometer immersed in the reacting material. The entire mass is cooled to maintain the temperature at 130°–138° C. The reaction, therefore, takes place slowly and the styrene remains in the reaction vessel uniformly distributed through the mixture. Within eight minutes the exothermic generation of heat ceases and the entire contents of the reacting vessel harden to a polymer with a slight green color. By continuing the heating process for an additional twenty minutes at this temperature, or by raising the temperature to 200° C. for five minutes, the polymer will set to a colorless resinous body.

In another example, 6.65 grams monochlormaleic anhydride is heated with 5.2 grams of styrene at 130° C. for 2 minutes until the first small bubbles indicate the beginning of an exothermic reaction. The test tube is removed from the oil bath and air-cooled. The amount of cooling needed is considerably less than in the case of maleic anhydride and styrene. The mixture is maintained at 130° C. for three hours, in which time a clear, transparent resin is formed.

In still another example, a mixture of 6.65 grams monochlormaleic anhydride and 4.9 grams maleic anhydride is heated to 60° C. with 10.4 grams styrene. The mixture is heated to 100° C. in a test tube for one-half hour. An orderly reaction ensues, and on cooling the mass, a transparent and colorless solid is obtained. The temperature is raised to 200° C. for 10 minutes, and then cooled in ice water.

This resinous material obtained in any of the above examples may be sub-divided and molded into articles without further purification. It will soften when heated to 175°–250° C. but will not melt. The softened material will readily take the shape of the mold into which it is compressed and will shrink from the mold when cooled so that it is easily removed. Molded objects of any shape or design may be formed from the resin of my invention by the methods well known in the art, or, the softened resin may be placed in other ways: for example, the resin may be placed between two plates of glass and pressed in the softened condition to produce fracture-proof glass. Also, the softened resin may be drawn into threads and rods of any shape and design or shaped into a tubular form.

The finely divided resin may be heated in admixture with inert fillers, e. g., wood flour, asbestos, casein, etc. and shaped by any desired method. Likewise, there may be incorporated coloring materials in powdered form. If desired, fillers and/or coloring materials may be added to the reaction mixture of the anhydride and the vinyl compound rather than to the prepared resin.

The reaction may take place directly in a form or mold of the exact or approximate shape and configuration of the finished object desired so that no subsequent molding is required. In a typical example, substantially equimolecular proportions of styrene in maleic anhydride consisting of 5.4 grams styrene and 4.9 grams maleic anhydride are heated to 60° C. for 3 minutes. A portion of this well-mixed, homogeneous solution is poured into a small test tube which serves as a form and illustrates how rod-shaped objects may be prepared. The test tube is maintained at 120° C. for five minutes by immersion in an oil bath until the viscosity of the said mass has definitely increased so that the said mass which has partly polymerized will not flow readily. When these conditions appear, the mass or mixture in the test tube is cooled to 100° C. for one-half minute to moderate the exothermic reaction which has begun, after which the temperature of the mass is allowed or caused to rise slowly to 125–138° C. for 20 minutes during which period a slow reaction takes place. Thereafter the temperature is raised to 200° C. for 10 minutes and the test tube is plunged into ice water, whereupon the resin separates from the test tube and may be removed. If desired, the reaction may be carried out in a mold wherein provision is made to apply some degree of external pressure to the mixture or mass for the purpose of compensating the shrinkage of the material.

Objects made in this way may also be machined and polished, and they possess the properties previously described. The resin prepared according to this new procedure is as clear as the clearest glass or crystal. By adding an oil-soluble dye to the original reaction mixture, colored resinous products can be formed which possess the transparency of the colorless resin.

Objects prepared from the new resin herein described have a high resistance to all organic liquids. They are insoluble in hydrocarbons of the aliphatic, naphthenic and aromatic types, in dilute alkalies and esters, alcohols, ketones and anhydrides. The lower members of the latter organic series, such as ethyl acetate, acetic anhydride, and acetone, produce a slight swelling but the original shape and size may be had if the swelled articles are heated for a short time.

The objects may be machined and polished by conventional methods. The polished objects or any objects prepared by shrinking from a mold have a lustre equal to the most highly polished glassware. Objects obtained from this resin will remain substantially rigid below 150° C. and will not crack when cooled suddenly. They will be consumed when a flame is applied, but will not support combustion and have a high tensile strength and modulus of rupture.

Considerable modification is possible in the selection of a vinyl compound and anhydride employed as well as in the steps of the reaction within the limits given without departing from the essential features of the invention.

I claim:

1. The method of making a synthetic resinous product which comprises mixing together a vinyl compound and an anhydride whose formula is represented by:

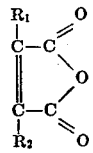

where $R_1$ and $R_2$ each stand for one of a group consisting of hydrogen, halogen, sulphonic acid radical, alkyl radical, aryl radical, and aralkyl radical, heating said mixture at a temperature below the boiling point of the lowest-boiling reacting component at the pressure employed, said temperature being sufficiently high to cause a reaction to take place, and maintaining the temperature of the reacting mass below the boiling point at the pressure employed of the lowest boiling of said reacting components until it is no longer possible to generate an appreciable amount of heat exothermically, to form a resinous product.

2. The process of claim 1 wherein the anhydride reacted is maleic anhydride.

3. The process of claim 1 wherein styrene and maleic anhydride are reacted.

4. The method of making a synthetic resinous product which comprises mixing together a vinyl compound and an anhydride whose formula is represented by:

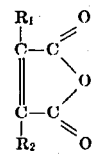

where $R_1$ and $R_2$ each stand for one of a group consisting of hydrogen, halogen, suplhonic acid radical, alkyl radical, aryl radical, and aralkyl radical, heating said mixture at a temperature below the boiling point of the lowest-boiling reacting component at the pressure employed, said temperature being sufficiently high to cause a reaction to take place, and maintaining the temperature of the reacting mass below the boiling point at the pressure employed of the lowest boiling of said reacting components until it is no longer possible to generate an appreciable amount of heat exothermically, to form a resinous product, and thereafter heating the product at a temperature above the boiling point of any of the unreacted material to free the product substantially thereof.

5. The process of claim 4 wherein the anhydride reacted is maleic anhydride.

6. The process of claim 4 wherein styrene and maleic anhydride are reacted.

7. The method of making a synthetic resinous product which comprises mixing a vinyl compound and an anhydride whose formula is represented by:

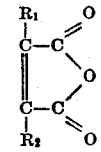

where $R_1$ and $R_2$ each stand for one of a group consisting of hydrogen, halogen, sulphonic acid radical, alkyl radical, aryl radical, and aralkyl radical, the anhydride not being in excess molecularly of the vinyl compound, heating said mixture at a temperature below the boiling point of the lowest-boiling reacting component of the mixture at the pressure employed, said temperature being sufficiently high to cause a reaction to take place, maintaining the temperature of the reacting mass below the boiling point at the pressure employed of the lowest boiling of said reacting components until it is no longer possible to generate an appreciable amount of heat exothermically, to form a resinous product, and thereafter heating the product at a temperature above the boiling point of any of the unreacted material to free the product substantially thereof.

8. The process of claim 7 wherein the anhydride reacted is maleic anhydride.

9. The process of claim 7 wherein styrene is reacted with maleic anhydride.

10. The method of making a synthetic resinous object of a desired shape or form which comprises adding a vinyl compound and an anhydride whose formula is represented by:

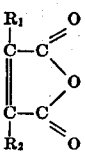

wherein $R_1$ and $R_2$ each stand for one of a group consisting of hydrogen, halogen, sulphonic acid radical, alkyl radical, aryl radical, and aralkyl radical to a mold of approximate shape and configuration of the finished object desired, the anhydride not being in excess molecularly of the vinyl compound, heating said mixture at a temperature below the boiling point of the lowest-boiling reacting component of the mixture at the pressure employed, said temperature being sufficiently high to cause a reaction to take place, maintaining the temperature of the reacting mass below the boiling point at the pressure employed of the lowest boiling of said reacting components until it is no longer possible to generate an appreciable amount of heat exothermically, to form a resinous product, heating the product at a temperature above the boiling point of any of the unreacted material to free the product substantially thereof, cooling the mold and product, and thereafter removing the object from the mold.

11. The process of claim 10 wherein the anhydride reacted is maleic anhydride.

12. The process of claim 10 wherein styrene is reacted with maleic anhydride.

13. A process comprising adding together a vinyl compound and an anhydride whose formula is represented by:

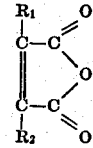

where $R_1$ and $R_2$ each stand for one of a group consisting of hydrogen, halogen, sulphonic acid radical, alkyl radical, aryl radical, and aralkyl radical, gently heating the mixture to form a homogeneous liquid before a substantial degree of reaction takes place, continuing said heating to cause the components to react, and controlling the temperature of the reacting mass so that the temperature thereof does not reach the boiling point at the pressure employed of the lowest boiling of said reacting components.

14. A process comprising adding together styrene and maleic anhydride in at least substantially equimolecular proportion, gently heating the mixture to form a homogeneous liquid before a substantial degree of reaction takes place, continuing said heating to cause the components to react, and controlling the temperature of the reacting mass so that the temperature thereof does not reach the boiling point at the pressure employed of the styrene.

HOWARD L. GERHART.